United States Patent
Ueda

(10) Patent No.: US 9,785,524 B2
(45) Date of Patent: Oct. 10, 2017

(54) FAULT TOLERANT SERVER

(71) Applicant: NEC Corporation, Tokyo (JP)

(72) Inventor: Chikashi Ueda, Tokyo (JP)

(73) Assignee: NEC Corporation, Tokyo (JP)

( * ) Notice: Subject to any disclaimer, the term of this patent is extended or adjusted under 35 U.S.C. 154(b) by 109 days.

(21) Appl. No.: 14/641,146

(22) Filed: Mar. 6, 2015

(65) Prior Publication Data

US 2015/0269037 A1 Sep. 24, 2015

(30) Foreign Application Priority Data

Mar. 24, 2014 (JP) ................................ 2014-059873

(51) Int. Cl.
  *G06F 11/00* (2006.01)
  *G06F 11/20* (2006.01)
  *G06F 11/16* (2006.01)

(52) U.S. Cl.
  CPC ...... *G06F 11/2038* (2013.01); *G06F 11/1658* (2013.01); *G06F 11/1645* (2013.01); *G06F 2201/83* (2013.01)

(58) Field of Classification Search
  USPC ........................................................ 714/13
  See application file for complete search history.

(56) References Cited

U.S. PATENT DOCUMENTS

2006/0253731 A1* 11/2006 Petruzzo ............. G06F 11/1456
                                                      714/6.2
2014/0129871 A1*  5/2014 Poenaru ................. G06F 11/07
                                                      714/2

FOREIGN PATENT DOCUMENTS

| JP | H07-306795 A   | 11/1995 |
| JP | 2006-178616 A  | 7/2006  |
| JP | 2009-199197 A  | 9/2009  |
| JP | 2011-081588 A  | 4/2011  |
| JP | 2013-020566 A  | 1/2013  |

OTHER PUBLICATIONS

Japanese Office Action dated Mar. 31, 2015, with a partial English translation.

* cited by examiner

*Primary Examiner* — Sarai Butler
(74) *Attorney, Agent, or Firm* — McGinn IP Law Group, PLLC

(57) ABSTRACT

A fault tolerant server according to the present invention configured to duplicate information processing by an online subsystem and an offline subsystem, the fault tolerant server operates to: execute entire copy processing for copying all data being stored in the memory of the online subsystem into the memory of the offline subsystem without stopping execution of information processing by the processor of the online subsystem, before start of duplication; detect data, the data satisfying a criterion indicating that content of data is changed during the entire copy processing, among data being stored in the memory of the online subsystem; and copy the detected data from the memory of the online subsystem into the memory of the offline subsystem.

11 Claims, 7 Drawing Sheets

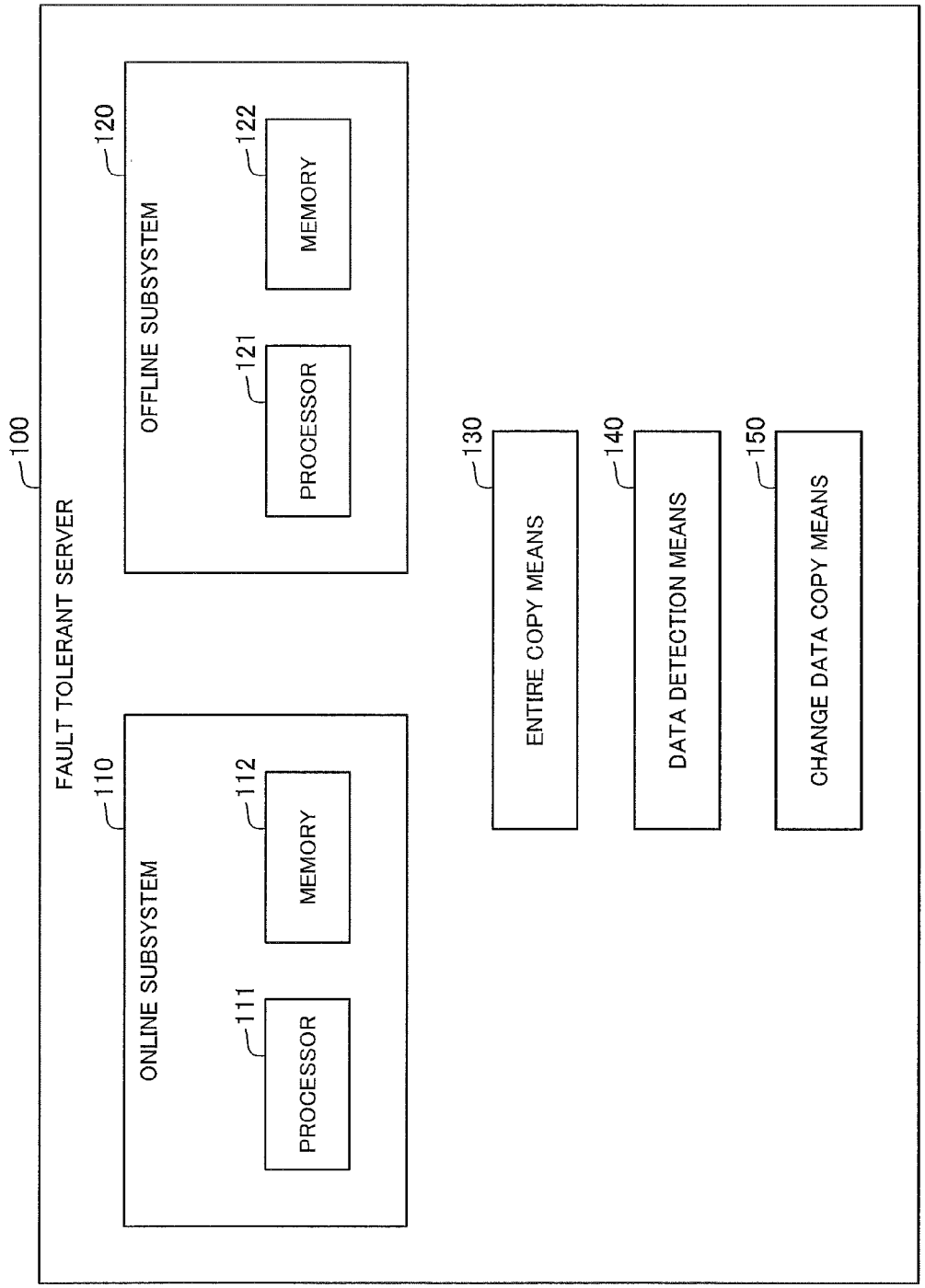

FAULT TOLERANT SERVER

INCORPORATION BY REFERENCE

The present application is based upon and claims the benefit of priority from Japanese patent application No. 2014-059873, filed on Mar. 24, 2014, the disclosure of which is incorporated herein in its entirety by reference.

TECHNICAL FIELD

The present invention relates to a fault tolerant server, more specifically, a fault tolerant server performing duplication processing.

BACKGROUND ART

A fault tolerant server (Fault Tolerant Server: FT sever) that duplicates information processing of same data by performing same processing by each of two subsystems such as an online system and an offline system is known (see Patent Document 1). On this type of fault tolerant sever, a result of information processing performed by the online system is usually used, however, when failure occurs on the online system, the offline system performing the same processing replaces the online system as a new online system. Thereby, a stop of information processing can be prevented. Meanwhile, as a realization method of duplication processing, there is a hardware method and a software method.

Herein, as information processing is duplicated by using the two subsystems on the fault tolerant sever, content of a memory mounted on the each subsystem is coincident with each other. However, when an offline subsystem is in a condition of stopping while information processing is performed by an online subsystem, content of the memory of the online system and content of the memory of the offline system will be different each other. As a result, after exchanging a CPU of the offline system or starting an Operating System (hereinafter referred to as OS), it is required to copy collectively all pages of the memory of the online system into the memory of the offline system before synchronizing the offline system with the online system. Herein, a page of the memory is a unit to manage a storage region of the memory.
Patent Document 1: JP 2009-199197 A

SUMMARY

However, for example, assume that speed of a memory copy from the online system to the offline system is 8 GB/s, it takes 30 seconds to copy a memory having 256 GB as a total capacity. Therefore, a problem occurs wherein during the 30 seconds for the memory copy, the OS stops and information processing by the fault tolerant sever is also stopped. As a result of this, there is a possibility that availability as the fault tolerant server is decreased.

Accordingly, an object of the present invention is to provide a fault tolerant server which solves the above described problem that the availability as the fault tolerant server is decreased.

To achieve the object, a fault tolerant server as an aspect of the present invention configured to duplicate information processing by an online subsystem including a processor and a memory and an offline subsystem including a processor and a memory, the fault tolerant server comprising:

an entire copy unit for executing entire copy processing for copying all data being stored in the memory of the online subsystem into the memory of the offline subsystem without stopping execution of information processing by the processor of the online subsystem, before start of duplication of the information processing by the online subsystem and the offline subsystem;

a data detection unit for detecting data, the data satisfying a criterion indicating that content of data is changed during the entire copy processing, among data being stored in the memory of the online subsystem;

a change data copy unit for copying the detected data from the memory of the online subsystem into the memory of the offline subsystem.

Further, a non-transitory computer readable medium storing a program as another aspect of the present invention comprising instructions for causing a control device, the control device being equipped in a fault tolerant server configured to duplicate information processing by an online subsystem including a processor and a memory and an offline subsystem including a processor and a memory, to function as:

an entire copy unit for executing entire copy processing for copying all data being stored in the memory of the online subsystem into the memory of the offline subsystem without stopping execution of information processing by the processor of the online subsystem, before start of duplication of the information processing by the online subsystem and the offline subsystem;

a data detection unit for detecting data, the data satisfying a criterion indicating that content of data is changed during the entire copy processing, among data being stored in the memory of the online subsystem;

a change data copy unit for copying the detected data from the memory of the online subsystem into the memory of the offline subsystem.

Further, a memory data copy method for a fault tolerant server as another aspect of the present invention configured to duplicate information processing by an online subsystem including a processor and a memory and an offline subsystem including a processor and a memory, the method comprising:

executing entire copy processing for copying all data being stored in the memory of the online subsystem into the memory of the offline subsystem without stopping execution of information processing by the processor of the online subsystem, before start of duplication of the information processing by the online subsystem and the offline subsystem;

detecting data, the data satisfying a criterion indicating that content of data is changed during the entire copy processing, among data being stored in the memory of the online subsystem;

copying the detected data from the memory of the online subsystem into the memory of the offline subsystem.

With the configuration described above, the present invention can provide a fault tolerance server being capable of increasing availability.

BRIEF DESCRIPTION OF DRAWINGS

FIG. 7 is a block diagram showing a configuration of a fault tolerance server according to a second exemplary embodiment of the present invention.

EXEMPLARY EMBODIMENTS

First Exemplary Embodiment

Figure 1:
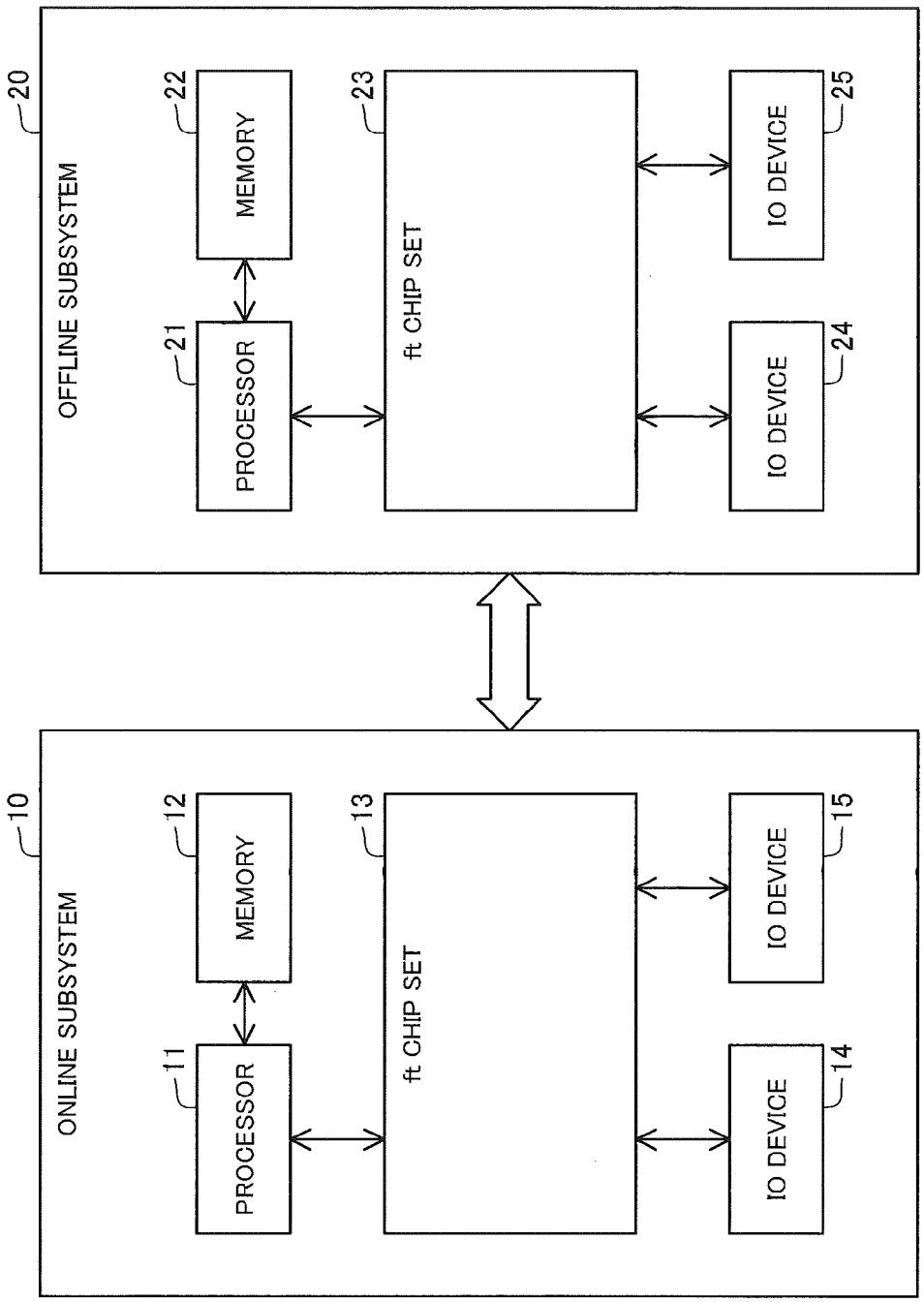
FIG. 1 is a block diagram showing a configuration of a fault tolerance server according to a first exemplary embodiment of the present invention.
Figure 2:
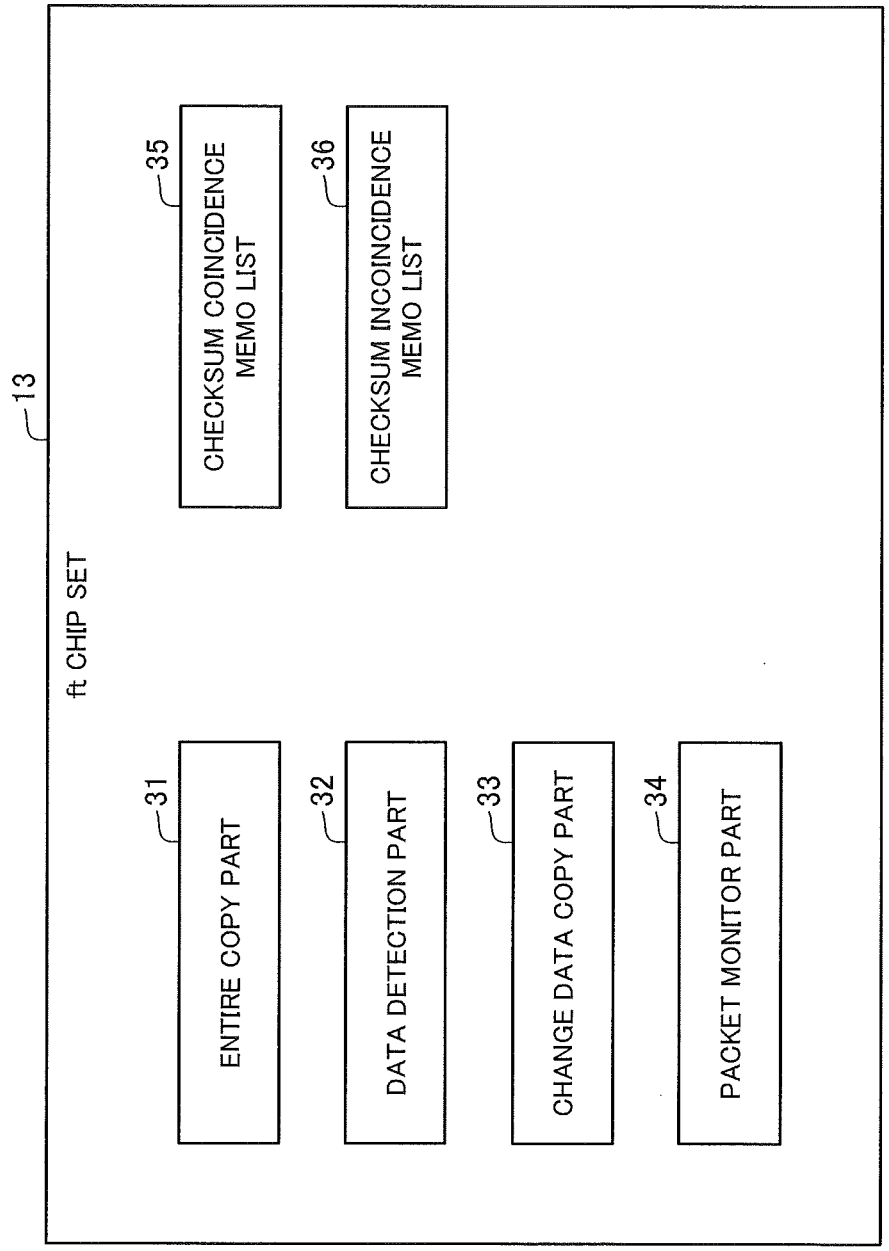
FIG. 2 is a function block diagram showing a configuration of a ft chip set configuring the fault tolerant server disclosed in FIG. 1.

A first exemplary embodiment of the present invention will be described with reference to FIGS. 1-6. FIGS. 1-2 are diagrams to explain a configuration of a fault tolerant server, and FIGS. 3-6 are diagrams to explain an operation of the fault tolerant server.
[Configuration]

A fault tolerant server according to this exemplary embodiment of the present invention comprises one information processing device or a plurality of information processing devices, the each information processing device includes a processor and a storage device. In addition, as shown in FIG. 1, the fault tolerant server comprises an online subsystem 10 and an offline subsystem 20. The both subsystems 10 and 20 are configured to execute duplication processing (synchronous processing) wherein same information processing of same data is performed.

Specifically, the online subsystem 10 comprises a processor 11 (processor), a memory 12, a ft chip set 13, and IO devices 14, 15. Meanwhile, the offline subsystem 20 similarly comprises a processor 21, a memory 22, a ft chip set 23, and IO devices 24, 25. The both processors 11 and 21 operate to perform same arithmetic processing by using same data stored respectively in memories 12 and 22. Therefore, even if failure occurs in the online subsystem 10, the information processing can be performed continuously by the offline subsystem 20.

Herein, the fault tolerant server may comprise such that each of components such as the processors 11 and 21 or the memories 12 and 22 configuring the respective subsystems 10 and 20 is configured by individual hardware or virtualization by using software. Meanwhile, the fault tolerance server may apply not only the hardware method but also the software method using a high-speed check point system (dirty page/memory content synchronous system by transferring CPU context), or a virtual lock-step system (an operation system by recording/reproducing input information).

Herein, it is required that content of the memory 12 and content of the memory 22 mounted on the respective subsystems 10 and 20 is coincident with each other to perform the duplication processing by the fault tolerant server. Therefore, after exchanging the processor 21 of the offline subsystem 20 or starting an OS (Operating System), it is required to synchronize the memory 12 with the memory 22 of the respective subsystems 10 and 20 before starting the duplication processing (synchronous processing) performed by the both subsystems 10 and 20. That is to say, it is required to copy data in the memory 12 of the online subsystem 10 being continuing to operate into the memory 22 of the offline subsystem 20. The each of online subsystem 10 and the offline subsystem 20 has a configuration to execute a memory copy before starting the above described duplication processing. Below, a configuration to execute the memory copy will be described.

A configuration to execute the above described memory copy is provided on the ft chip set 13 of the online subsystem 10, for example. Herein, a configuration of the ft chip set 13 of the online subsystem 10 will be described, however, the ft chip set 23 of the offline subsystem 20 has a similar configuration because the offline subsystem 20 can be an online system.

To be more specific, firstly, the ft chip set 13 of the online subsystem 10 is provided with a control part (control device) and a storage part, each being not illustrated. Meanwhile, as shown in FIG. 2, the ft chip set 13 includes, an entire copy part 31, a data detection part 32, a change data copy part 33 and a packet monitor part 34, each being built by embedding a program in the provided control part. In addition, the ft chip set 13 includes, a checksum coincidence memo list 35 and a checksum incoincidence memo list 36, each being formed in the provided storage device. Herein, a "Data Mover" to be a function part for executing mainly the memory copy is configured by the entire copy part 31, the data detection part 32 and the change data copy part 33. Below, each configuration will be described in detail.

Firstly, each the memory 12 and the memory 22 of the respective subsystems 10 and 20 has a page that is a unit to manage a storage region. Then, as will be described later, copying data in a memory is performed per page. For example, a page has capacity of some bits. However, copying data in the memory may be performed per unit other than the page.

At first, prior to memory copy processing after starting the OS, the data detection part 32 (data detection means) calculates a checksum for each of all pages in the memory 12 of the online subsystem 10 based on content stored in the each page. Then, the data detection part 32 stores a calculated checksum so as to be associated with a corresponding page. For example, the calculated checksum is stored in the storage device of the ft chip set so as to be associated with identification information of the memory page.

The above described checksum is information representing a summary of content of data being stored in a page of the memory. Therefore, if content of data of each memory page is different from each other, there is a high probability that each checksum being a summary of the content will be also different from each other. Herein, the checksum may be calculated by any method as long as a value of the calculated checksum is based on content of a memory page. For example, the data detection part 32 may calculate other summary information such as a hash value of data of a memory page. Hereinafter, the calculated checksum is referred to as a "first checksum" (first summary).

Meanwhile, after this, the data detection part 32 calculates again a checksum for each of all pages in the memory 12 of the online subsystem 10 based on content stored in the each page. That is to say, the data detection part 32 performs a first-time checksum calculation prior to memory copy processing, and subsequently, after starting memory copy processing by the entire copy part 31 which will be described later and also during performing entire copy processing, the data detection part 32 performs a second-time checksum calculation. Meanwhile, the second-time checksum calculation may be performed for every memory page being completely copied by the entire copy part 31 in a sequential order. The second-time checksum calculation may be also performed after a finish of copying all memory pages by the entire copy part 31. Herein, the calculated checksum is referred to as a "second checksum" (second summary).

Then, the data detection part 32 compares the stored "first checksum" with the "second checksum" calculated by the second-time checksum calculation wherein the both checksums correspond to a same memory page, and checks whether or not there is a difference (change) between the both checksums. As a result of comparing, when there is no difference between the both checksums, the data detection part 32 registers page information for identifying a corresponding memory page in the checksum coincidence memo list 35. Meanwhile, as a result of comparing, when there is a difference between the both checksums, the data detection part 32 registers page information for identifying a corresponding memory page in the checksum incoincidence memo list 36. That is to say, when there is a difference between the checksums, the memory page is detected as data satisfying a criterion indicating that content of a same memory page is changed during the entire copy processing.

As described above, the entire copy part 31 (entire copy means) performs the entire copy processing for copying all pages in the memory 12 of the online subsystem 10 into the offline subsystem 20 after the finish of the first-time checksum calculation by the data detection part 32. At this time, the entire copy processing is performed through background processing without stopping the operation of the OS of the fault tolerant server, i.e., the processor 11 of the online subsystem 10, and with continuing execution of information processing by the online subsystem 10. For example, priority of the entire copy processing in the processor 11 is set lower than other information processing.

The change data copy part 33 (change data copy means) refers to the checksum incoincidence memo list 36 after the entire copy processing by the entire copy part 31 and the second-time checksum calculation by the data detection part 32. Then, the change data copy part 33 copies the memory page being registered in the checksum incoincidence memo list 36 from the memory 12 of the online subsystem 10 into the memory 22 of the offline subsystem 20. That is to say, the change data copy part 33 copies a memory page of which checksums have a difference, the memory page storing data satisfying the criterion indicating that content of a same memory page is changed during the entire copy processing, into the offline system.

Figure 3:
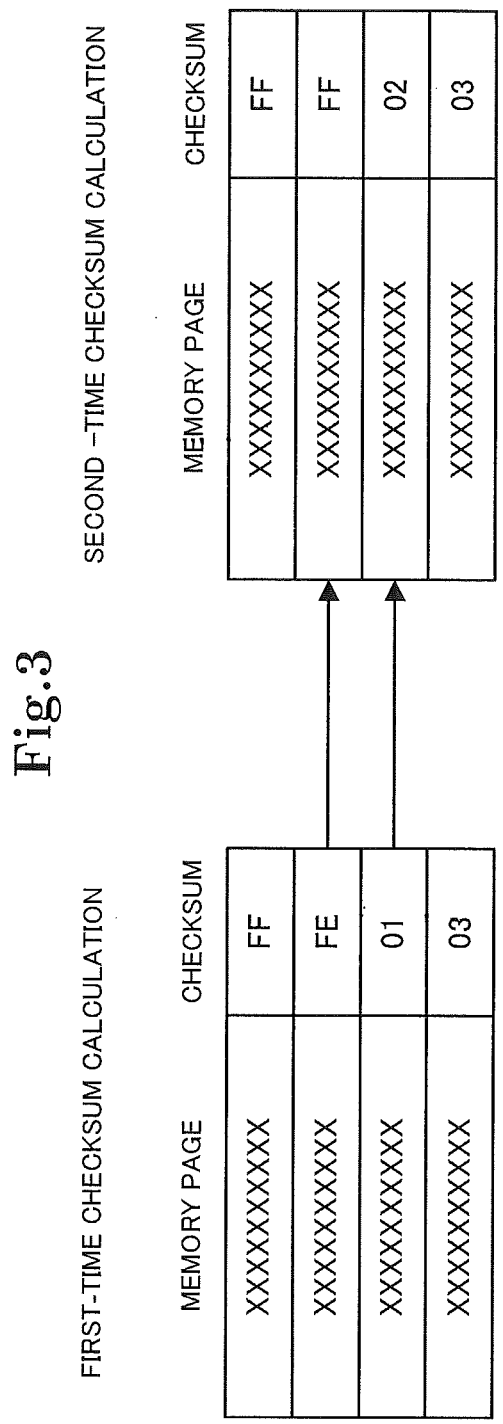
FIG. 3 is a diagram showing a copying state of a memory page performed by the fault tolerant server disclosed in FIG. 1.

A copying state of a memory page performed by the change data copy part 33 is described with reference to FIG. 3. A left part of FIG. 3 shows correspondence between content of a memory page and a checksum on an occasion of the first-time checksum calculation, while a right part of FIG. 3 shows correspondence between content of the memory page and a checksum on an occasion of the second-time checksum calculation. According to the example shown by FIG. 3, because a checksum in a second line from top of the memory page and a checksum in a third line from the top of the memory page being obtained at the time of the first-time checksum calculation are different respectively from those of the second-time checksum calculation, these memory pages are copied from the online subsystem 10 into the offline subsystem 20. Thereby, even though data in the memory changes during the entire copy processing, that is, even though data in the memory changes while being used by the OS, the data can be reflected from the online subsystem 10 on the offline subsystem 20.

Herein, when copying the memory page registered in the checksum incoincidence memo list 36, the change data copy part 33 stops the OS of the fault tolerant server, that is, stops the information processing by the online subsystem 10.

Then, the change memory copy part 33 executes batch copy processing wherein all memory pages being registered in the checksum incoincidence memo list 36 are copied collectively into the offline system. At this time, as thinkable number of memory pages being registered in the checksum incoincidence memo list 36 are less than number of all pages in the memory 12, a length of stopping time of the information processing by the fault tolerant server on the occasion of the batch copy processing is shorter than a time length of copying all pages.

Then, when the batch copy processing of the memory page being registered in the checksum incoincidence memo list 36 is finished, the change data copy part 33 starts duplication processing by the fault tolerant server. That is to say, the change data copy part 33 resumes the information processing by the processor 11 of the online subsystem 10 being stopped and also starts information processing by the processor 21 of the offline subsystem 20, and then the duplication processing, i.e., synchronous working is started.

Further, when the duplication processing is started, the change data copy part 33 copies the memory page being registered in the checksum coincidence memo list 35 from the memory 12 of the online subsystem 10 into the memory 22 of the offline subsystem 20 through the background processing without stopping the duplication processing. Herein, the memory page registered in the checksum coincidence memo list 35 is the memory page in which there is no difference between checksums before and after the entire copy processing, however, there is a case in which no difference occurs between the checksums even if content of a memory page changes. In order to make such the memory page be same in the both memories 12 and 22 of the respective subsystems 10 and 20, copying the memory page registered in the checksum coincidence memo list 35 is performed. This processing is to copy a memory page being not detected (undetected) as the memory page of which checksums have a difference, and therefore referred to as undetected data copy processing.

Specifically, by the undetected data copy processing, the change data copy part 33 reads respectively a memory page having a same address from each the memory 12 of the online subsystem 10 and the memory 22 of the offline subsystem 20. Then, the change data copy part 33 checks whether or not both content of the read data in the respective memory pages are coincident with each other. When the both content are coincident with each other, the change data copy part 33 does not copy the memory page. Meanwhile, when the both content are not coincident with each other, the change data copy part 33 writes and stores the read memory page of the online subsystem 10 into a same address of the respective the memory 12 of the online subsystem 10 and the memory 22 of the offline subsystem 20. That is to say, when the both content are not coincident with each other, the change data part 33 not only writes the memory page of the online subsystem 10 into the offline subsystem 20, but also stores again the memory page into the online subsystem 10. It is to ensure synchronous processing between the online subsystem 10 and the offline subsystem 20.

Meanwhile, during the above described undetected data copy processing, the packet monitor part 34 (change data copy means) monitors a packet, the packet is data respectively output from each of the processor 11 of the online subsystem 10 and the processor 21 of the offline subsystem 20. Then, when detecting that both content of the packets output from the respective processors 11 and 21 are not coincident with each other, the packet monitor part 34 stops the OS of the fault tolerant server, that is, stops the duplication processing performed by the online subsystem 10 and the offline subsystem 20. Further, the packet monitor part 34 copies collectively all memory pages stored in the memory 12 of the online subsystem 10 into the memory 22 of the offline subsystem 20. Herein, the copy processing is performed by the entire copy part 31, and the copy processing is finished, the duplication processing is resumed.

[Operation]

Figure 4:
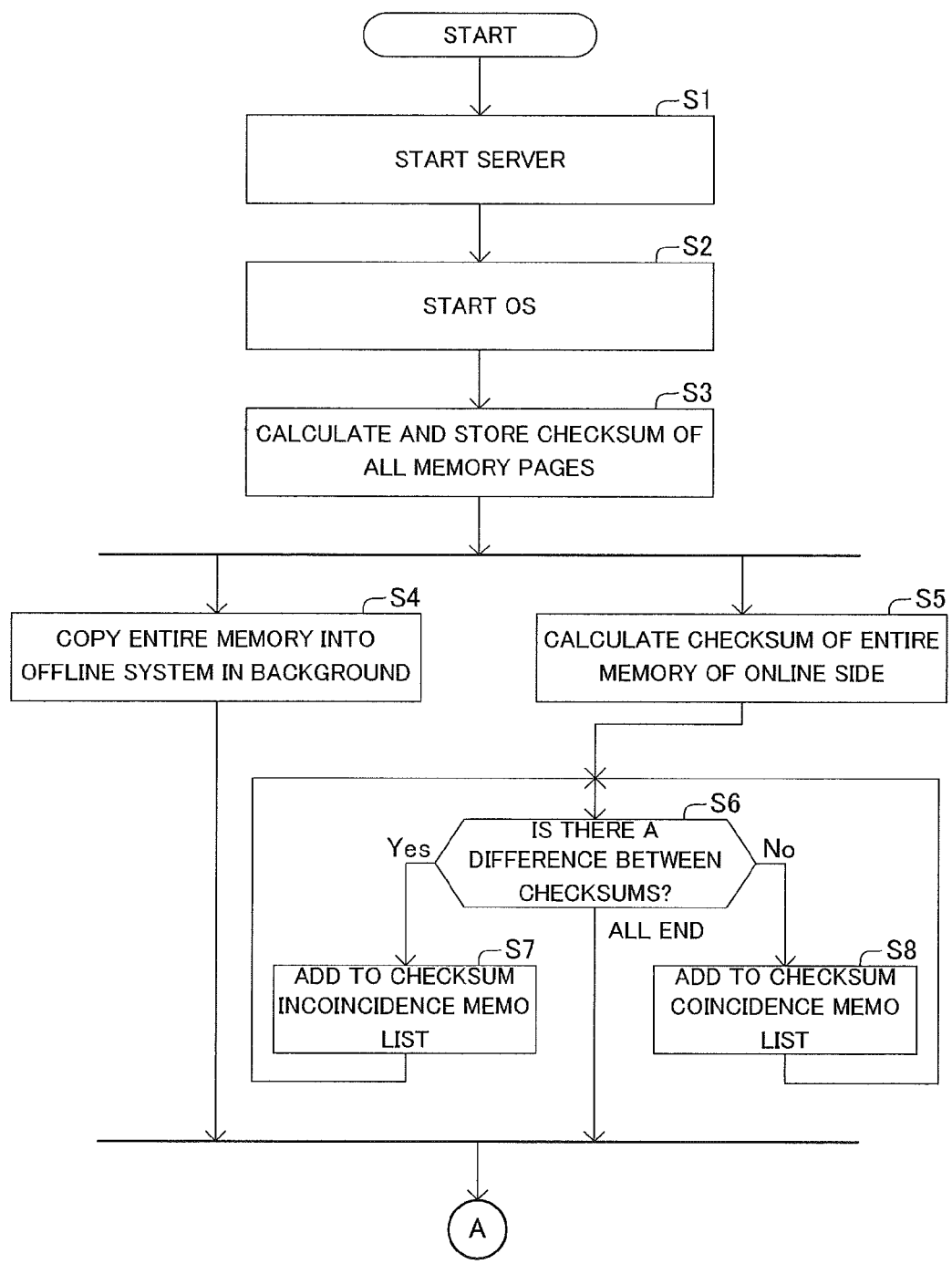
FIG. 4 is a flowchart showing an operation of the fault tolerant server disclosed in FIG. 1.
Figure 5:
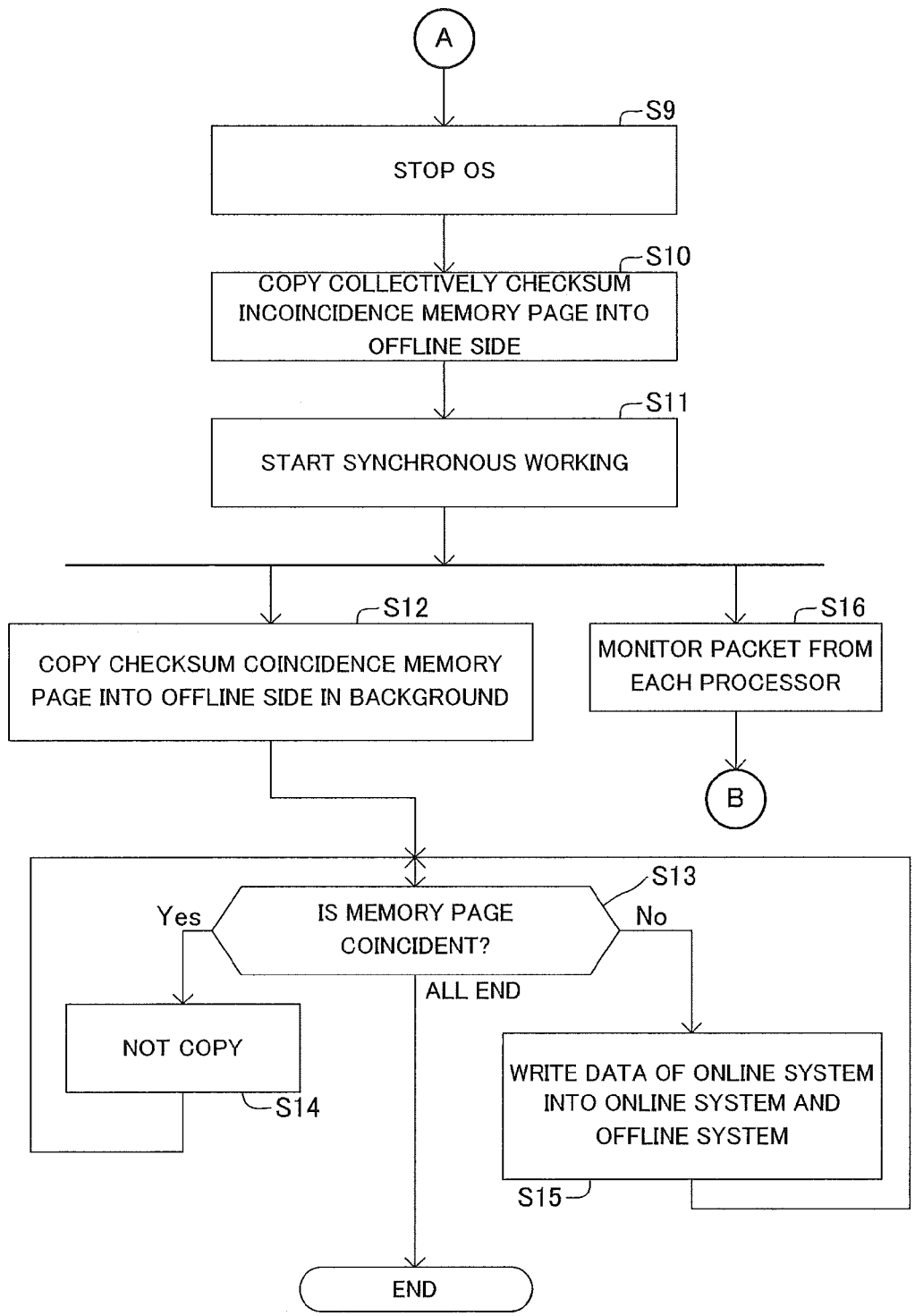
FIG. 5 is a flowchart showing an operation of the fault tolerant server disclosed in FIG. 1.
Figure 6:
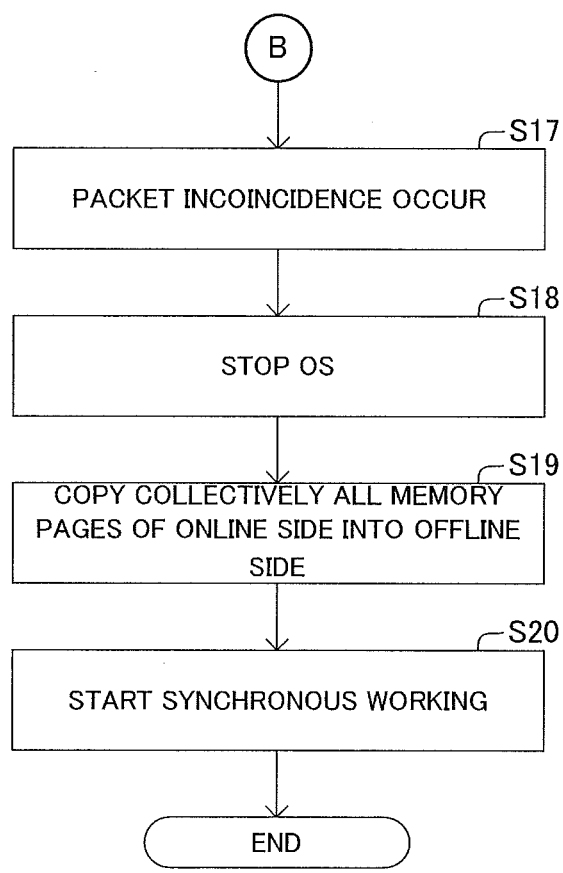
FIG. 6 is a flowchart showing an operation of the fault tolerant server disclosed in FIG. 1.

Next, an operation of the above described fault tolerant server will be explained with reference to flowcharts in FIGS. 4-6.

When the fault tolerant server is started (step S1) and the OS is started (step S2), processing for synchronizing the respective memories 12 and 22 with each other is started in order to perform duplication processing. At this time, the online subsystem 10 continues execution of usual information processing, and the OS is not in a stopped state.

At first, prior to memory copy processing, the data detection part 32 performs a first-time checksum calculation for each of all pages in the memory 12 of the online subsystem 10 based on content stored in the each page. Then, the data detection part 32 stores the calculated checksum so as to be associated with a corresponding page as a first checksum (step S3).

When the first-time checksum calculation for the each of all memory pages performed by the data detection part 32 is finished, the entire copy part 31 starts entire copy processing wherein the all pages in the memory 12 of the online subsystem 10 are copied into the memory 22 of the offline subsystem 20 (step S4). At this time, the OS of the fault tolerant server does not stop and performs the entire copy processing in background processing while continuing the information processing by the online subsystem 10.

Thereby, at first, content of the memory 12 of the online subsystem 10 can be copied into the memory 22 of the offline subsystem 20 without stopping the fault tolerant server.

Meanwhile, during the entire copy processing, the data detection part 32 performs again a second-time checksum calculation for each of all pages in the memory 12 of the online subsystem 10 based on content stored in the each page. The calculated checksum is a second checksum (step S5). At this time, the second-time checksum calculation is performed for a page being already copied into the memory 22 of the offline subsystem 20 by the entire copy part 31.

Then, the data detection part 32 compares the first checksum with the second checksum, the both checksums are of a same memory page, and checks whether or not there is a difference between the both checksums (step S6). As a result of comparing, in a case that there is a difference between the both checksums (step S6: Yes), the data detection part 32 registers page information for identifying a corresponding page in the checksum incoincidence memo list 36 (step S7). Meanwhile, as a result of comparing, in a case that there is no difference between the both checksums (step S6: No), the data detection part 32 registers page information for identifying a corresponding page in the checksum coincidence memo list 35 (step S8).

By the processing described above, a page of which checksums have a difference is detected as data satisfying a criterion indicating that content of a memory page is changed during the entire copy processing i.e., operation of the OS, and registered in the checksum incoincidence memo list 36. Herein, there is a case in which content of a memory page is changed even though there is no difference between checksums, the case does not satisfy the criterion. Meanwhile, the data detection part 32 performs the detection of a memory page being changed before and after the entire copy processing by using the checksum of the memory page, however, the detection of the page of which content is changed may be performed by using a other method.

Subsequently, when the above described entire copy processing by the entire copy part 31 (step S4) and the second-time checksum calculation by the data detection part 32 (steps S5-S8) are finished, the change data copy part 33 stops the information processing by the OS, i.e., the online subsystem 10 (step S9). Then, while being in a stopped state of the OS, the change data copy part 33 copies collectively the memory page registered in the checksum incoincidence memo list 36 from the memory 12 of the online subsystem 10 into the memory 22 of the offline subsystem 20 (step S10).

Thereby, in a case that content of data in the memory 12 is used by the OS and changed, the data can be reflected on the memory 22 of the offline subsystem 20. At this time, as number of pages being registered in the checksum incoincidence memo list 36 are less than number of all pages in the memory 12, a length of stopping time of the information processing by the fault tolerant server is shorter than a time length of copying all pages.

After that, when the above described batch copy processing of the memory page registered in the checksum incoincidence memo list 36 is finished, the change data copy part 33 resumes operating the OS of the fault tolerant server and starts duplication processing (synchronous processing) (step S11).

Subsequently, the change data copy part 33 copies the memory page being registered in the checksum coincidence memo list 35 from the memory 12 of the online subsystem 10 into the memory 22 of the offline subsystem 20 through background processing without stopping the duplication processing (step S12). By this processing, a memory page, the memory page in which no difference occurs between checksums before and after the entire copy processing even if content of the memory page changes, is made be same in the both memories 12 and 22 of the respective subsystems 10 and 20.

Specifically, according to the above described copy processing, the change data copy part 33 reads firstly content of each page in the memory 12 of the online subsystem 10 and content of each page in the memory 22 of the offline subsystem 20 respectively. Then, the change data copy part 33 checks whether or not content of the each read page is coincident with each other (step S13). When the content is coincident with each other (step S13: Yes), the change data copy part 33 does not perform copying the page (step S14). Meanwhile, when the content is not coincident with each other (step S13: No), the change data copy part 33 stores the read memory page of the online subsystem 10 into the each of the memory 12 of the online subsystem 10 and the memory 22 of the offline subsystem 20 respectively. It is to ensure synchronous processing between the online subsystem 10 and the offline subsystem 20.

Meanwhile, during the data copy processing of the memory page being registered in the checksum coincidence memo list 35 described above (steps S12-15), the packet monitor part 34 monitors a packet being respectively output from each of the processor 11 and the processor 21 of the respective subsystems 10 and 20 (step S16). When detecting that the both content of the packets output from the respective processors 11 and 21 are not coincident with each other (step S17), the packet monitor part 34 stops the OS of the server and also stops the duplication processing by the online subsystem 10 and the offline subsystem 20 (step S18).

Further, the packet monitor part 34 copies collectively all memory pages stored in the memory 12 of the online subsystem 10 into the memory 22 of the offline subsystem 20 (step S19). After that, when the copy processing of the all memory pages is finished, the packet monitor part 34 resumes the OS and also resumes the duplication processing (step S20).

As described above, according to the fault tolerant server of this exemplary embodiment, a time length of stopping the OS can be shorter than a time length in a case of copying all memory pages on the occasion of performing the memory copy between the online system and the offline system. As a result of this, a time length of stopping a service being provided by the fault tolerant server can be shorter, and thereby availability of the server itself can be increased.

Herein, according to the above described fault tolerant server, each checksum of a memory page is calculated before and after the entire copy processing, and the detection of a memory page having content being changed during the entire copy processing is performed, however, the detection of the memory page may be performed by a other method. For example, the data detection part 132 can hold content of all memory pages before the entire copy processing in any of the storage devices, determine whether or not the content of the memory pages is changed during the entire copy processing with reference to the held data, and detect the changed memory page.

Second Exemplary Embodiment

Next, a Second Exemplary Embodiment of the present invention will be explained with reference to FIG. 7.

A fault tolerant server 100 according to this exemplary embodiment comprises an online subsystem 110 including a processor 111 and a memory 112, and an offline subsystem 120 including a processor 121 and a memory 122. Meanwhile, the fault tolerant server is configured to duplicate information processing by the each of subsystems 110 and 120.

Meanwhile, the fault tolerant server 100 comprises an entire copy means 130, a data detection means 140 and a change data copy means 150.

Before starting duplication of information processing by the online subsystem 110 and the offline subsystem 120, the entire copy means 130 copies all data stored in the memory 112 of the online subsystem 110 into the memory 122 of the offline subsystem 120 without stopping execution of information processing performed by the processor 111 of the online subsystem 110.

The data detection means 140 detects data satisfying a criterion indicating that content of data is changed during the entire copy processing among the data stored in the memory 112 of the online subsystem 110.

The change data copy means 150 copies the data detected by the data detection means 140 from the memory 112 of the online subsystem 110 into the memory 122 of the offline subsystem 120.

According to the fault tolerant server 100 of the above described configuration, firstly, the online subsystem 110 is in a state wherein the processor 111 executes information processing by using the data stored in the memory 112 even though the offline subsystem 120 is in a stop state. In such the situation, when the offline subsystem 120 operates and duplicates information processing by synchronizing with the online subsystem 110, it is required to synchronize content of the memory 112 of the online subsystem 110 with content of the memory 122 of the offline subsystem 120.

Therefore, firstly, without stopping information processing by the online subsystem 110 and through background processing, the fault tolerant server 100 executes the entire copy processing wherein all data stored in the memory 112 of the online subsystem 110 is copied into the memory 122 of the offline subsystem 120. With this, the fault tolerant server 100 performs processing to detect data, the data satisfying a criterion indicating that content of data is changed during the entire copy processing, among data being stored in the memory 112 of the online subsystem 110. Then, the fault tolerant server 100 copies the detected data from the memory 112 of the online subsystem 110 into the memory 122 of the offline subsystem 120.

Herein, preferably, copying the detected data is performed with stopping execution of information processing by the processor 111 of the online subsystem 110 after finish of the entire copy processing. Subsequently, the duplication of the information processing is started by the both online subsystem 110 and the offline subsystem 120.

As a result, according to the fault tolerant server 100 of the present invention, all data of the memory 112 is copied at first in a state of executing information processing by the online subsystem 110 before start of synchronizing memories of the respective online subsystem 110 and offline subsystem 120 with each other, and thereby stop of the information processing can be suppressed. Meanwhile, after this, by copying only data having probably been changed in the memory 112 of the online subsystem 110 into the offline subsystem 120, capacity for copying can be suppressed for all data, and conforming the memory 112 to the memory 122 of the respective the online subsystem 110 and the offline subsystem 120 can be performed promptly. Especially, even though executing information processing by the online subsystem 110 is stopped during the copy processing, the stopping time will be shorter than the time in a case of copying all data. As a result, decreasing availability of the fault tolerant server can be suppressed.

<Supplementary Notes>

The whole or part of the exemplary embodiments disclosed above can be described as the following supplementary notes. Below, the outline of configuration according to the present invention will be described. However, the present invention is not limited to the following configurations.

(Supplementary Note 1)

A fault tolerant server configured to duplicate information processing by an online subsystem including a processor and a memory and an offline subsystem including a processor and a memory, the fault tolerant server comprising:

an entire copy unit for executing entire copy processing for copying all data being stored in the memory of the online subsystem into the memory of the offline subsystem without stopping execution of information processing by the processor of the online subsystem, before start of duplication of the information processing by the online subsystem and the offline subsystem;

a data detection unit for detecting data, the data satisfying a criterion indicating that content of data is changed during the entire copy processing, among data being stored in the memory of the online subsystem;

a change data copy unit for copying the detected data from the memory of the online subsystem into the memory of the offline subsystem.

(Supplementary Note 2)

The fault tolerant server according to Supplementary Note 1, wherein the change data copy unit copies the detected data into the memory of the offline subsystem after finishing the entire copy processing.

(Supplementary Note 3)

The fault tolerant server according to Supplementary Note 2, wherein the change data copy unit stops the information processing by the processor of the online subsystem after finishing the entire copy processing, and executes batch copy processing for copying all the detected data from the memory of the online subsystem into the memory of the offline subsystem.

(Supplementary Note 4)

The fault tolerant server according to Supplementary Note 3, wherein;

after finishing the batch copy processing, the change data copy unit resumes the information processing by the processor of the online subsystem being stopped, also starts information processing by the processor of the offline subsystem, and starts duplication of information processing.

According to the fault tolerant server of the above described configuration, the online subsystem executes information processing by the processor by using data being stored in the memory even though the offline subsystem is in a stop state. In such the situation, when the offline system operates and starts duplication of the information processing by synchronizing with the online system, it is required to synchronize content of the memory of the online system with the offline system. Therefore, firstly, without stopping information processing by the online system itself and through background processing, the online system executes the entire copy processing wherein all data stored in the memory of the online system itself is copied into the memory of the offline system. With this, the fault tolerant server performs processing to detect data, the data satisfying a criterion indicating that content of data is changed during the entire copy processing, among the data being stored in the memory of the online system. Then, the fault tolerant server copies the detected data from the memory of the online system into the memory of the offline system. Herein, preferably, copying the detected data is performed with stopping execution of the information processing by the processor of the online system after finish of the entire copy processing. Subsequently, the duplication of the information processing is started by the both online system and the offline system.

As a result, according to the fault tolerant server of the present invention, all data of a memory is copied at first in a state of executing information processing by the online system before start of synchronizing the online system with the offline system, and thereby stop of the information processing can be suppressed. Meanwhile, by copying only data having probably been changed in the memory of the online system during the entire copy processing into the offline system, capacity for copying can be suppressed for all data, and conforming the memory of the online system to the memory of the offline system can be performed promptly. Especially, even though executing information processing by the online system is stopped during the copy processing of the detected data, the stopping time will be shorter than a length of time for copying all data. As a result, decreasing availability of the fault tolerant server can be suppressed.

(Supplementary Note 5)

The fault tolerant server according to Supplementary Note 4, wherein;

after the batch copy processing and also after starting the duplication of information processing by the online subsystem and the offline subsystem, the change data copy unit executes undetected data copy processing for copying data being not detected as the data satisfying the criterion indicating that content of data is changed during the entire copy processing among the data being stored in the memory of the online subsystem, without stopping the duplication of the information processing by the online subsystem and the offline subsystem.

(Supplementary Note 6)

The fault tolerant server according to Supplementary Note 5, wherein;

on an occasion of the undetected data copy processing, the change data copy unit checks whether or not data stored in the memory of the online subsystem to be copied is coincident with data stored in the memory of the offline subsystem, and as a result of checking, in a case that the each data is coincident with each other, does not copy the data being stored in the memory of the online subsystem into the memory of the offline subsystem, and in a case that the each data is not coincident with each other, copies the data being stored in the memory of online subsystem into respective the memory of the online subsystem and the memory of the offline subsystem.

As a result of this, even in a case that there is undetected data due to not satisfying the criterion even though content of the data is changed during the above described entire copy processing among data in the memory of the online subsystem, by copying the undetected data into the memory of the offline subsystem, the both memories can be conformed to each other later. Herein, in a case that data of memories of respective the online subsystem and the offline subsystem is not same, by storing the data being stored in the memory of the online subsystem into the both memories of respective the online subsystem and the offline subsystem, duplication processing can be ensured.

(Supplementary Note 7)

The fault tolerant server according to Supplementary Note 5 or 6, wherein;

during the undetected data copy processing, the change data copy unit monitors data output respectively from each the processor of the online subsystem and the processor of the offline subsystem, and as a result of monitoring, in a case that the each data is not coincident with each other, stops the duplication of the information processing by the online subsystem and the offline subsystem, and copies collectively all the data being stored in the memory of the online subsystem into the memory of the offline subsystem.

In this way, during the above described undetected data copy processing, when detecting occurrence of incoincidence of data of information processing between the online system and the offline system, the fault tolerant server stops the duplication processing and copies all data of the memory of the online system into the memory of the offline system. As a result of this, unconformity of duplication processing can be surely suppressed and therefore decreasing availability can be suppressed.

(Supplementary Note 8)

The fault tolerant server according to any of Supplementary Notes 1-7, wherein;

the data detection unit calculates a summary of all data being stored in the memory of the online subsystem before the entire copy processing as a first summary, calculates a summary of all data being stored in the memory of the online subsystem during the entire copy processing as a second summary, and detects data of which the first summary and the second summary are different as the data satisfying the criterion indicating that content of data is changed during the entire copy processing.

By this, data in which a change occurs during the entire copy processing can be detected by simple processing. Meanwhile, when summarizing data, there is a case that both summaries of data are same before and after a change of content of the data. Such data can be copied appropriately into the offline subsystem by copying undetected data by the above described undetected data copy processing.

(Supplementary Note 9)

A non-transitory computer readable medium storing a program comprising instructions for causing a control device, the control device being equipped in a fault tolerant server configured to duplicate information processing by an online subsystem including a processor and a memory and an offline subsystem including a processor and a memory, to function as:

an entire copy unit for executing entire copy processing for copying all data being stored in the memory of the online subsystem into the memory of the offline subsystem without stopping execution of information processing by the processor of the online subsystem, before start of duplication of the information processing by the online subsystem and the offline subsystem;

a data detection unit for detecting data, the data satisfying a criterion indicating that content of data is changed during the entire copy processing, among data being stored in the memory of the online subsystem;

a change data copy unit for copying the detected data from the memory of the online subsystem into the memory of the offline subsystem.

(Supplementary Note 10)

The non-transitory computer readable medium storing the program according to Supplementary Note 9, wherein the change data copy unit copies the detected data into the memory of the offline subsystem after finishing the entire copy processing.

(Supplementary Note 11)

The non-transitory computer readable medium storing the program according to Supplementary Note 10, wherein the change data copy unit stops the information processing by the processor of the online subsystem after finishing the entire copy processing, and executes batch copy processing for copying all the detected data from the memory of the online subsystem into the memory of the offline subsystem.

(Supplementary Note 12)

A memory data copy method for a fault tolerant server configured to duplicate information processing by an online subsystem including a processor and a memory and an offline subsystem including a processor and a memory, the method comprising:

executing entire copy processing for copying all data being stored in the memory of the online subsystem into the memory of the offline subsystem without stopping execution of information processing by the processor of the online subsystem before start of duplication of the information processing by the online subsystem and the offline subsystem;

detecting data, the data satisfying a criterion indicating that content of data is changed during the entire copy processing, among data being stored in the memory of the online subsystem;

copying the detected data from the memory of the online subsystem into the memory of the offline subsystem.

(Supplementary Note 13)

The memory data copy method according to Supplementary Note 12, comprising:

copying the detected data into the memory of the offline subsystem after finishing the entire copy processing.

(Supplementary Note 14)

The memory data copy method according to Supplementary Note 13, comprising:

stopping the information processing by the processor of the online subsystem after finishing the entire copy processing; and executing batch copy processing for copying all the detected data from the memory of the online subsystem into the memory of the offline subsystem.

(Supplementary Note 15)

A fault tolerant server configured to duplicate info' nation processing by an online subsystem including a processor and a memory and an offline subsystem including a processor and a memory, the fault tolerant server comprising:

an entire copy means configured to execute entire copy processing for copying all data being stored in the memory of the online subsystem into the memory of the offline subsystem without stopping execution of information processing by the processor of the online subsystem, before start of duplication of the information processing by the online subsystem and the offline subsystem;

a data detection means configured to detect data, the data satisfying a criterion indicating that content of data is changed during the entire copy processing, among data being stored in the memory of the online subsystem;

a change data copy means configured to copy the detected data from the memory of the online subsystem into the memory of the offline subsystem.

The program described above is stored in the storage device or recorded on a computer-readable medium. For example, the recording medium is a portable medium such as a flexible disk, an optical disk, a magnet-optical disk and a semiconductor memory.

Although the present invention has been described above referring to the exemplary embodiments, the present invention is not limited to the exemplary embodiments. The configurations and details of the present invention can be changed and modified in various manners that can be understood by one skilled in the art within the scope of the present invention.

DESCRIPTION OF REFERENCE NUMERALS 10 online subsystem
11 processor
12 memory
13 ft chip set
14, 15 IO device
20 offline subsystem
21 processor
22 memory
23 ft chip set
24, 25 IO device
31 entire copy part
32 data detection part
33 change data copy part
34 packet monitor part
35 checksum coincidence memo list
36 checksum incoincidence memo list
100 fault tolerant server
110 online subsystem
111 processor
112 memory 120 offline subsystem
121 processor
122 memory
130 entire copy means
140 data detection means
150 change data copy means

The invention claimed is:

1. A fault tolerant server configured to duplicate information processing by an online subsystem including a processor and a memory and an offline subsystem including a processor and a memory, the fault tolerant server comprising:
an entire copy unit for executing entire copy processing for copying all data being stored in the memory of the online subsystem into the memory of the offline subsystem without stopping execution of information processing by the processor of the online subsystem, before start of duplication of the information processing by the online subsystem and the offline sub system;
a data detection unit for detecting data, the data satisfying a criterion indicating that content of data is changed during the entire copy processing, among data being stored in the memory of the online subsystem; and
a change data copy unit for copying the detected data from the memory of the online subsystem into the memory of the offline subsystem,
wherein the change data copy unit copies the detected data into the memory of the offline subsystem after finishing the entire copy processing,
wherein the change data copy unit stops the information processing by the processor of the online subsystem after finishing the entire copy processing, and executes batch copy processing for copying all the detected data from the memory of the online subsystem into the memory of the offline subsystem,
wherein after finishing the batch copy processing, the change data copy unit resumes the information processing by the processor of the online subsystem being stopped, also starts information processing by the processor of the offline subsystem, and starts duplication of information processing,
wherein after the batch copy processing and also after starting the duplication of information processing by the online subsystem and the offline subsystem, the change data copy unit executes undetected data copy processing for copying data being not detected as the data satisfying the criterion indicating that content of data is changed during the entire copy processing among the data being stored in the memory of the online subsystem, without stopping the duplication of the information processing by the online subsystem and the offline subsystem, and
wherein:
on an occasion of the undetected data copy processing, the change data copy unit checks whether or not data stored in the memory of the online subsystem to be copied is coincident with data stored in the memory of the offline subsystem, and as a result of checking,
in a case that the each data is coincident with each other, does not copy the data being stored in the memory of the online subsystem into the memory of the offline subsystem, and
in a case that the each data is not coincident with each other, copies the data being stored in the memory of online subsystem into respective the memory of the online subsystem and the memory of the offline subsystem.

2. The fault tolerant server according to claim 1, wherein;
during the undetected data copy processing, the change data copy unit monitors data output respectively from each the processor of the online subsystem and the processor of the offline subsystem, and as a result of monitoring,
in a case that the each data is not coincident with each other, stops the duplication of the information processing by the online subsystem and the offline subsystem, and
copies collectively all the data being stored in the memory of the online subsystem into the memory of the offline subsystem.

3. The fault tolerant server according to claim 1, wherein;
the data detection unit
calculates a summary of all data being stored in the memory of the online subsystem before the entire copy processing as a first summary,
calculates a summary of all data being stored in the memory of the online subsystem during the entire copy processing as a second summary, and
detects data of which the first summary and the second summary are different as the data satisfying the criterion indicating that content of data is changed during the entire copy processing.

4. The fault tolerant server according to claim 1, wherein the data is not copied by the entire copy unit to a storage device other than the memory of the offline subsystem and the memory of the online subsystem.

5. The fault tolerant server according to claim 1, wherein the entire copy processing is performed through a background processing without stopping the operation of an operating system of the fault tolerant server,
wherein the data detection unit performs a first-time checksum calculation prior to the entire copy processing, and subsequently, after starting the entire copy processing by the entire copy unit, and
wherein the entire copy unit performs the entire copy processing for copying all pages in the memory of the online subsystem into the offline subsystem after finishing of the first-time checksum calculation by the data detection unit.

6. A non-transitory computer readable medium storing a program comprising instructions for causing a control device, the control device being equipped in a fault tolerant server configured to duplicate information processing by an online subsystem including a processor and a memory and an offline subsystem including a processor and a memory, to function as:
an entire copy unit for executing entire copy processing for copying all data being stored in the memory of the online subsystem into the memory of the offline subsystem without stopping execution of information processing by the processor of the online subsystem, before start of duplication of the information processing by the online subsystem and the offline sub system;
a data detection unit for detecting data, the data satisfying a criterion indicating that content of data is changed during the entire copy processing, among data being stored in the memory of the online subsystem; and
a change data copy unit for copying the detected data from the memory of the online subsystem into the memory of the offline subsystem,
wherein the change data copy unit copies the detected data into the memory of the offline subsystem after finishing the entire copy processing, wherein the change data copy unit stops the information processing by the processor of the online subsystem after finishing the entire copy processing, and executes batch copy processing for copying all the detected data from the memory of the online subsystem into the memory of the offline subsystem, wherein after finishing the batch copy processing, the change data copy unit resumes the information processing by the processor of the online subsystem being stopped, also starts information processing by the processor of the offline subsystem, and starts duplication of information processing, wherein after the batch copy processing and also after starting the duplication of information processing by the online subsystem and the offline subsystem, the change data copy unit executes undetected data copy processing for copying data being not detected as the data satisfying the criterion indicating that content of data is changed during the entire copy processing among the data being stored in the memory of the online subsystem, without stopping the duplication of the information processing by the online subsystem and the offline subsystem, and wherein:

on an occasion of the undetected data copy processing, the change data copy unit checks whether or not data stored in the memory of the online subsystem to be copied is coincident with data stored in the memory of the offline subsystem, and as a result of checking, in a case that the each data is coincident with each other, does not copy the data being stored in the memory of the online subsystem into the memory of the offline subsystem, and in a case that the each data is not coincident with each other, copies the data being stored in the memory of online subsystem into respective the memory of the online subsystem and the memory of the offline subsystem.

7. The non-transitory computer readable medium storing the program according to claim 6, wherein the data is not copied by the entire copy unit to a storage device other than the memory of the offline subsystem and the memory of the online subsystem constituting a duplex system.

8. The non-transitory computer readable medium storing the program according to claim 6, wherein the entire copy processing is performed through a background processing without stopping the operation of an operating system of the fault tolerant server, wherein the data detection unit performs a first-time checksum calculation prior to the entire copy processing, and subsequently, after starting the entire copy processing by the entire copy unit, and wherein the entire copy unit performs the entire copy processing for copying all pages in the memory of the online subsystem into the offline subsystem after finishing of the first-time checksum calculation by the data detection unit.

9. A memory data copy method for a fault tolerant server configured to duplicate information processing by an online subsystem including a processor and a memory and an offline subsystem including a processor and a memory, the method comprising:

executing entire copy processing for copying all data being stored in the memory of the online subsystem into the memory of the offline subsystem without stopping execution of information processing by the processor of the online subsystem, before start of duplication of the information processing by the online subsystem and the offline subsystem;

detecting data, the data satisfying a criterion indicating that content of data is changed during the entire copy processing, among data being stored in the memory of the online subsystem;

copying the detected data from the memory of the online subsystem into the memory of the offline subsystem;

copying the detected data into the memory of the offline subsystem after finishing the entire copy processing;

stopping the information processing by the processor of the online subsystem after finishing the entire copy processing;

executing batch copy processing for copying all the detected data from the memory of the online subsystem into the memory of the offline subsystem;

after finishing the batch copy processing, resuming the information processing by the processor of the online subsystem being stopped, also starts information processing by the processor of the offline subsystem, and starts duplication of information processing;

after the batch copy processing and also after starting the duplication of information processing by the online subsystem and the offline subsystem, executing undetected data copy processing for copying data being not detected as the data satisfying the criterion indicating that content of data is changed during the entire copy processing among the data being stored in the memory of the online subsystem, without stopping the duplication of the information processing by the online subsystem and the offline subsystem;

on an occasion of the undetected data copy processing, checking whether or not data stored in the memory of the online subsystem to be copied is coincident with data stored in the memory of the offline subsystem, and as a result of checking;

in a case that the each data is coincident with each other, not copying the data being stored in the memory of the online subsystem into the memory of the offline subsystem; and in a case that the each data is not coincident with each other, copying the data being stored in the memory of online subsystem into respective the memory of the online subsystem and the memory of the offline subsystem.

10. The memory data copy method according to claim 9, wherein the data is not copied to a storage device other than the memory of the offline subsystem and the memory of the online subsystem constituting a duplex system.

11. The memory data copy method according to claim 9, wherein the entire copy processing is performed through a background processing without stopping the operation of an operating system of the fault tolerant server, wherein a first-time checksum calculation is performed prior to the entire copy processing, and subsequently, after starting the entire copy processing, and wherein the entire copy processing is performed for copying all pages in the memory of the online subsystem into the offline subsystem after finishing of the first-time checksum calculation.

* * * * *